United States Patent [19]

Weckenbrock et al.

[11] Patent Number: 5,267,035
[45] Date of Patent: Nov. 30, 1993

[54] MOTION DETECTION FOR VIDEO INCLUDING THAT OBTAINED FROM FILM

[75] Inventors: Hermann J. Weckenbrock, Bordentown, N.J.; Christopher H. Strolle, Glenside, Pa.

[73] Assignee: Samsung Electronics Co., Ltd., Suwon, Rep. of Korea

[21] Appl. No.: 742,764

[22] Filed: Aug. 8, 1991

[51] Int. Cl.⁵ .................... H04N 9/78; H04N 7/18
[52] U.S. Cl. ........................... 358/105; 358/214
[58] Field of Search .......... 358/105, 31, 140, 214–216, 358/133, 136, 138

[56] References Cited

U.S. PATENT DOCUMENTS

| | | | |
|---|---|---|---|
| 4,651,211 | 3/1987 | Weckenbrock et al. | 358/105 |
| 4,672,442 | 6/1987 | Yamaguchi et al. | 358/140 |
| 4,881,125 | 11/1989 | Krause | 358/141 |
| 5,023,713 | 6/1991 | Nishigori | 358/31 |

FOREIGN PATENT DOCUMENTS 0082882  3/1989  Japan .
0149990  6/1991  Japan .

Primary Examiner—James J. Groody
Attorney, Agent, or Firm—Robert E. Bushnell

[57] ABSTRACT

A method and apparatus for detecting image motion in a television signal obtained by conversion of film images to a sequence of television video fields using the 2-3 film pulldown technique, comprising generating a plurality of interim motion detection signals which are always based upon a comparison of image points in the video signal which are spaced two sequential fields apart, and gating the plurality of interim motion detection signals together in order to generate a final motion detection signal.

17 Claims, 4 Drawing Sheets

MOTION DETECTION FOR VIDEO INCLUDING THAT OBTAINED FROM FILM

BACKGROUND OF THE INVENTION

1. Field of the Invention

The invention relates to a method and apparatus of motion detection which is particularly well suited to detect motion in a television signal which was obtained from a film-to-television converter using the conventional 2-3 pull-down technique.

2. Description of the Prior Art

Motion picture film is normally exposed at a rate of 24 frames per second. When reproducing these films in a television system with a frame rate of 25 frames per second (such as PAL or SECAM) it is universal practice to simply reproduce the 24-frame rate film at 25 frames per second. The small increase in the pitch of the reproduced sound and the slight reduction in the running time (i.e., speed-up) of the film have been a generally accepted compromise. The use of this method in a 30 frame per second television system (such as NTSC), however, is totally unacceptable. This 30 frame per second system uses a special method in which one motion picture frame is exposed for two television fields, whereas the next motion picture frame is exposed for three television fields. This method of alternately holding the film in the projector gate for either two or three television field exposures is called 2-3 pulldown.

Although 2-3 pulldown has worked well in the past, it can cause problems when digital signal processing methods are applied to the television signal. For example, many digital television systems require an accurate motion detector in order to select a proper signal processing algorithm, e.g., for deciding whether or not to use a line or frame comb filter for luminance/chrominance signal separation. Known motion detectors for this purpose generally compare two picture elements that are a frame (two fields) apart and base their motion detection decision on the difference in signal amplitude between these two picture elements. If the television picture is obtained from a motion picture film and a 2-3 pulldown has been used for the frame-rate conversion, it has been found, as will be explained in greater detail below, that the motion detector will fail regularly, which may lead to a degradation of picture quality. If, for example, the motion detection signal was being used for controlling the use of either a line or a frame comb filter in a television signal processor, a regularly occurring failure of the motion detector (i.e., an indication of no motion when in fact there is motion) will result in a periodic switching between these two comb filter techniques. This leads to a visible periodic flicker in the resolution of the television picture, as explained in more detail below, due to the different resolutions resulting from the use of a line or field comb filter.

To more clearly understand why a conventional motion detector will fail, consider FIG. 1. Firstly, assume that each of the motion picture frames are different. A motion detector comparing corresponding picture elements separated by a frame interval will detect motion between, e.g., corresponding picture elements in fields 4 and 6 (F4/F6). Similarly, it will detect motion between corresponding picture elements in fields F5/F7, F6/F8, and F7/F9. It will not detect motion, however, when it compares picture elements from fields F8/F10 since, although these picture elements are a television frame apart, both these fields correspond to the same motion picture frame (MP 4) and are thus spatially identical. Continuing this evaluation of the motion detector, one can easily see that the motion detector will indicate "no motion" every five television fields although all motion picture frames are different. This wrong decision can lead to the selection of the wrong luma/chroma signal separation algorithm at a regularly occurring low frequency rate, i.e., 12 Hz, and thus result in visually annoying artifacts in the displayed picture due to the difference in signal resolution between line and field comb filtering.

U.S. Pat. No. 4,933,759 uses a plurality of field delay circuits to perform various combinations of signal comparisons in order to develop a motion detection signal. For ease of understanding, the sequential fields (n−2) through (n+3) of FIG. 1 of this patent will be referred to as F1-F6, respectively. Thus, the comparators 1 and 2 of FIG. 2 are responsive to signal in fields F1, F3, F4 and F3, F4, F5, and then F2, F3, F4 and F3, F4, F6, respectively, when switches 1 and 2 are switched to their alternate positions.

Due to the fact that in the above-noted comparisons, adjacent fields are being compared, i.e., fields F3/F4; F3/F4/F5; F2/F3/F4; and F3/F4, and the presence of line interlace, a 4-point averaging technique is required to spatially match a point in one field with a corresponding point in an adjacent field (due to the interlace "line offset").

This necessarily complicates the comparator functions and also, due to the possibility of e.g., a black/white transition occurring in the image space between adjacent field lines, which would result in a gray output from the comparator, the threshold required to indicate motion would have to be set a relatively high value, thereby increasing the chance of an indication of no motion when in fact there was motion.

SUMMARY OF THE INVENTION

In accordance with the principles of the present invention, a plurality of television interim motion detection signals are developed by always comparing image points in the video signal which are spaced two sequential fields apart, and then gating the interim motion detection signals together in order to generate a final motion detection signal.

In accordance with a further aspect of the invention, all but one of the interim motion detection signals are combined using an AND function, and the output of the AND function and the remaining interim motion detection signal are combined using an OR function.

In accordance with a still further aspect of the invention, the interim motion detection signals combined using the AND function correspond to a comparison of image points in the television image which are spatially adjacent to the image points used to develop the remaining interim motion detection signal.

In accordance with one embodiment of the invention, the interim motion detection signals are all developed by a single motion detector, whose output is successively delayed for providing the plurality of interim motion detection signals to a gating circuit arrangement.

For a fuller understanding of the present invention, reference should now be made to the following detailed description of the preferred embodiments of the invention and to the accompanying drawings.

DETAILED DESCRIPTION OF THE PREFERRED EMBODIMENTS

Figure 2:
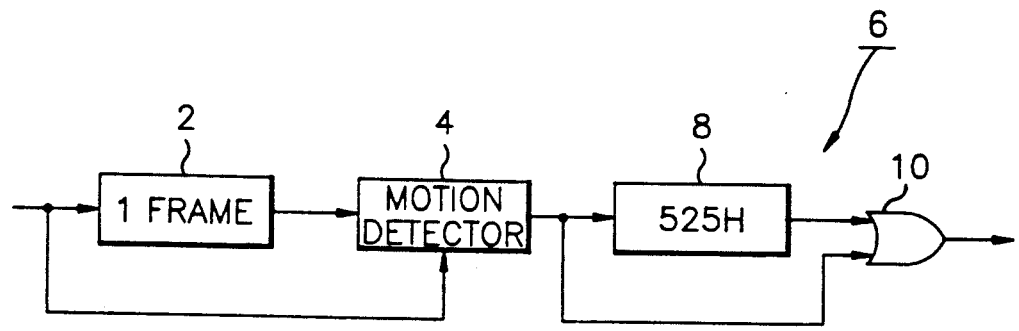
FIG. 2 illustrates a basic circuit employing the principles of the present invention.

A simple motion detection circuit arrangement which can be used, for example, in a television receiver for controlling whether or not a line or frame comb filter will be used for the luma/chroma separation circuit, is shown in FIG. 2. The remainder of the television receiver, including the luma/chroma separation circuit and the remainder of the television signal processing and display circuitry, is not shown for ease of understanding the invention and for clarity of the drawings. It is noted that all such components which are not shown are of the type which are well known to those of ordinary skill in the art.

As shown in FIG. 2, the television signal is applied to the input of a one-frame delay 2. The output of frame delay 2 is supplied as a first signal input to a motion detector 4. The second input to detector 4 is the undelayed television signal. Motion detector 4 comprises a conventional type of motion detector, such as one which compares the signal level of two pixels simultaneously presented at its respective inputs and determines if their difference exceeds a preset threshold level. If the difference between the amplitude level of the signal input is less than the threshold, motion detector 4 provides an output indicating no motion. The output of motion detector 4 is able to change at the pixel rate, thereby providing a plurality of interim motion detection signals, each motion detection signal being based upon a comparison of pixels which are exactly one frame apart in the television signal. A gating circuit 6 is used to gate the interim motion detection signals together in order to provide a final motion detection signal.

In the FIG. 2 embodiment, gating circuit 6 includes a frame delay 8 and an OR gate 10. In the NTSC system, frame delay 8 comprises a delay of 525 horizontal (H) lines. When detector 4 provides a current motion detection signal to OR gate 10, delay 8 provides the motion detection signal to OR gate 10 which was generated one frame ago. For example, when detector 4 provides a signal based upon a pixel comparison in F5/F7, delay 8 provides a signal based upon a comparison one frame earlier, i.e., F3/F5. Thus, when the erroneous F3/F5 detection signal (indicating "no motion" and having a LOW logic level) is applied to gate 10, the correct F5/F7 signal (indicating "motion" and having a HIGH logic level) which is also applied, will dominate OR gate 10, thus preventing the final output signal from being in error.

Figure 3:
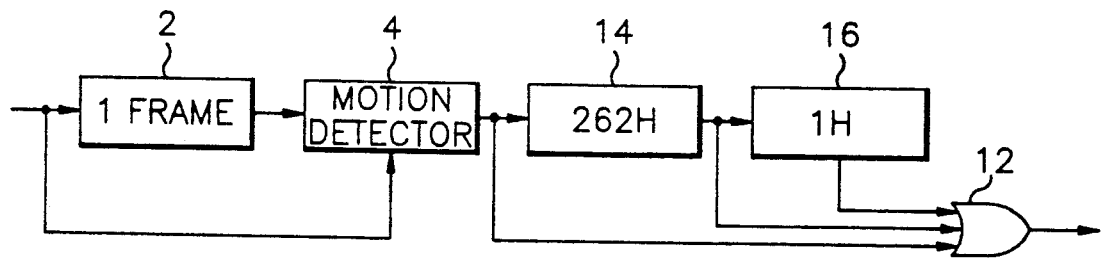
FIG. 3 illustrates a further embodiment of the invention having a different technique for gating together the interim motion detection signals.

FIG. 3 illustrates a motion detector which is substantially similar to that shown in FIG. 2, however, a more reliable transition between a "motion" and a "no motion" signal is provided. This is accomplished by a gating circuit comprising a three-input OR gate 12, for receiving the successive interim motion detection signals provided from the output of motion detector 4. A first interim motion detection signal is directly applied to gate 12, a second interim motion detection signal is applied to gate 12 via a 262 H delay 14, and a third interim motion detection signal is applied to gate 12 via the 262 H delay 14 plus a 1 H delay 16. In this manner, the final motion detector signal, the output of OR gate 12, is a combination of, e.g., an F10/F8 and two F9/F7 interim motion detection signals. There are two F9/F7 signals due to the action of IH delay 16, which two signals indicate if there is motion in the lines spatially above and below the current line being compared in F10/F8.

Figure 1:
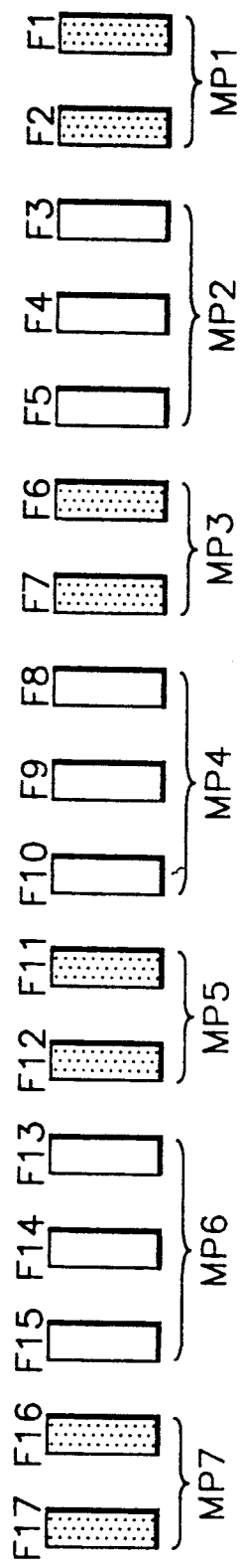
FIG. 1 illustrates the result of the application of the 2-3 pulldown film-to-television frame-rate conversion technique.
Figure 4:
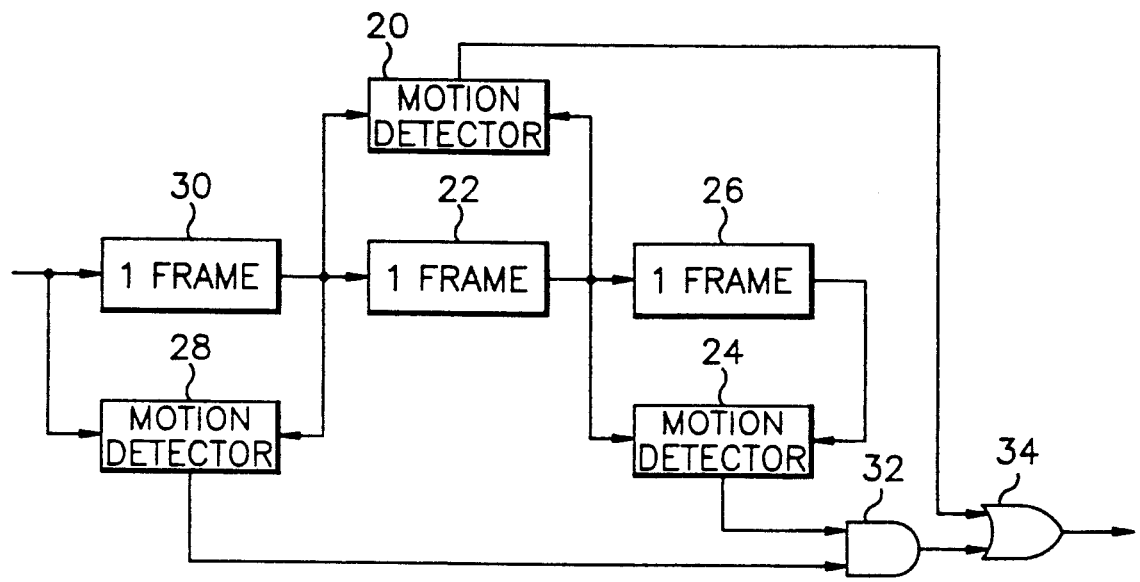
FIG. 4 illustrates a circuit for more accurately determining the occurrence of motion, in accordance with a further embodiment of the invention.

Another circuit for accurately determining motion is shown in FIG. 4. Referring again for a moment to FIG. 1, assume that a simple motion detector is comparing pixels in frames F10 and F8. Since the picture elements in F10 and F8 are identical, it will not detect motion even if MP 4 is different from MP 3 and MP 5. The motion detector of FIG. 4 not only makes the F8/F10 comparison via detector 20 and frame-delay 22, but also the F8/F6 comparison via detector 24 and frame-delay 26 to check for motion between MP 3 and MP4, and the F10/F12 comparison via detector 28 and frame-delay 30 to check for motion between MP 4 and MP 5. An AND gate 32 receives the outputs of detectors 24 and 28, and an OR gate 34 receives the output of AND gate 32 and detector 20. Logic gates 32,34 determine motion in the following way: If motion detector 20 indicates motion, then the output of OR gate 34 will indicate motion. If motion detector 20 indicates "no motion", then the output of gate 34 is determined by the outputs of motion detectors 24 and 28. Only if both of these motion detectors indicate motion, a logical HIGH value, will the output of gate 32 be HIGH and the output of gate 34 indicate motion. It is noted that if only one of motion detectors 24 and 28 indicates motion, we are either at the start or the end of a motion scene.

Figure 5:
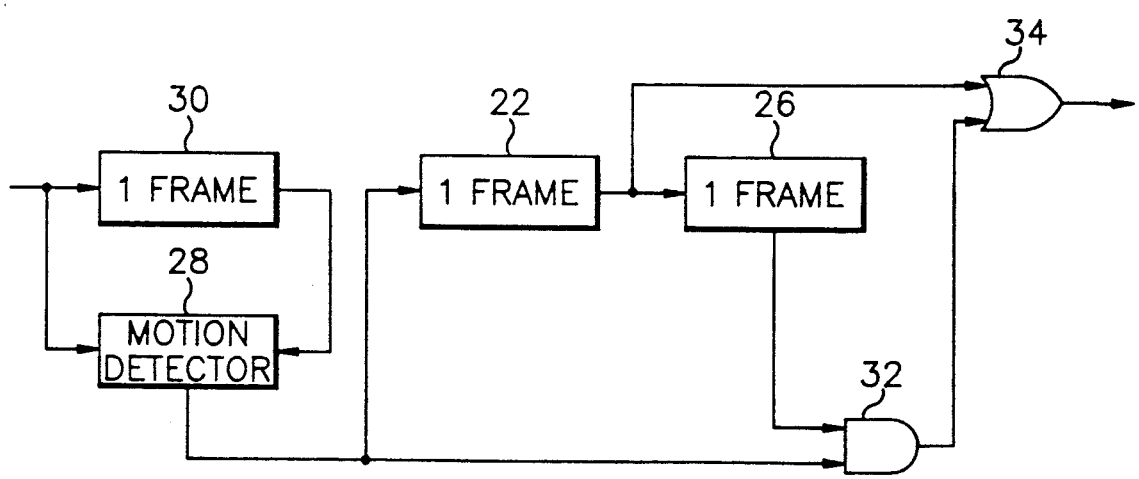
FIG. 5 illustrates a simplified version of the FIG. 4 embodiment.

FIG. 5 performs exactly the same function as FIG. 4. However, in this case the motion signal output from detector 28 (and not the video signal), is merely delayed by two additional frames. With this arrangement, the same function is accomplished with less hardware. That is, the output of delays 22 and 26 provide motion detection signals which correspond to the outputs of detectors 20 and 24, respectively, of the FIG. 4 embodiment. It is noted that this embodiment also provides significant reductions in bit storage requirements and processing because the motion detector output signal is typically one bit, while the video signal can be 8 bits or more.

Figures 6A, 6B:
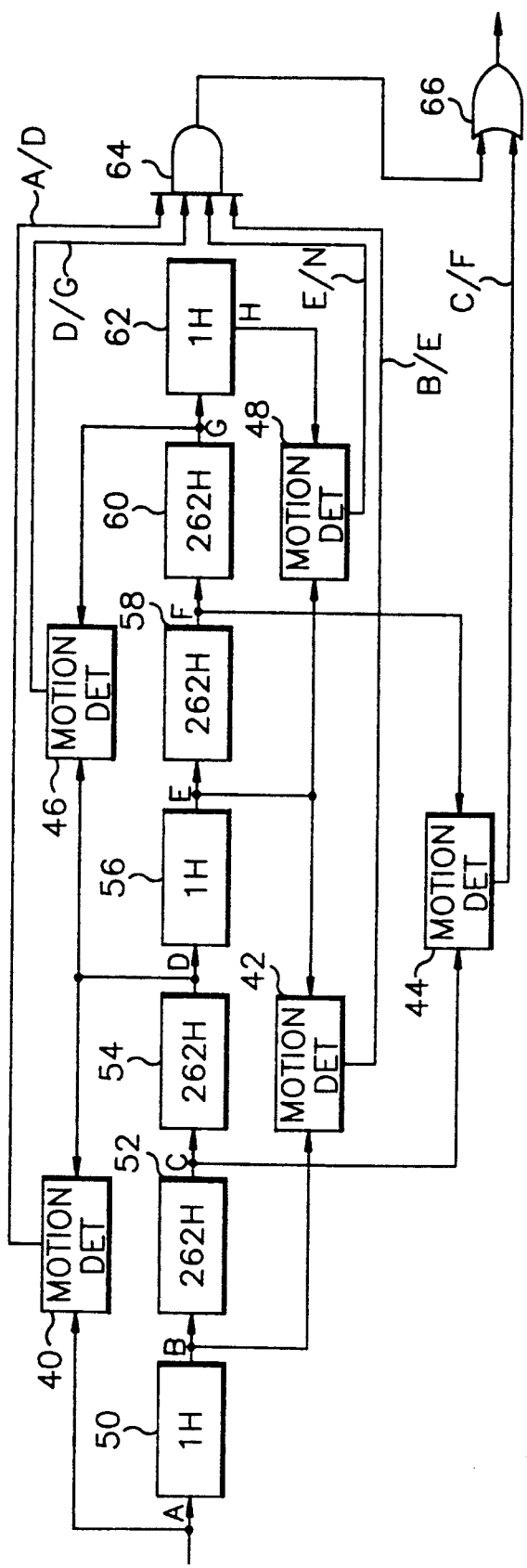
FIG. 6a illustrates the lines of a television field and is useful for understanding the embodiments shown in FIG. 6b and 7.
FIG. 6b illustrates a further embodiment of the invention.

FIG. 6a illustrates some of the lines of successive television fields, wherein lines used in the following illustrated examples are shown shaded and given reference designations.

FIG. 6b shows another embodiment of the invention including a plurality of motion detectors 40, 42, 44, 46 and 48. A series connection of delay circuits 50, 52, 54, 56, 58, 60 and 62 are grouped so as to provide a single frame delay between the inputs of each of detectors 40–48, with each frame delay comprising a 1-line delay and two 262-line delays. With this arrangement, additional lines above and below the current line (but in different fields), are used to determine motion. For example, assume that line C is the current line and will be displayed or processed next. If motion detector 44 indicates that there is no difference between corresponding pixels in line C and line F (the line which occurred one frame earlier), then motion will only be indicated if all other motion detectors 40, 42, 46 and 48 indicate motion, i.e., if respective pixel comparisons in lines A/D, B/E, D/G and E/H indicate motion. An AND gate 64 receives the outputs of detectors 40, 42, 46, and 48 and an OR gate 66 receives the output from AND gate 64 and detector 44 for generating the final motion detection signal in a manner such as previously described with respect to the prior Figures.

Figure 7:
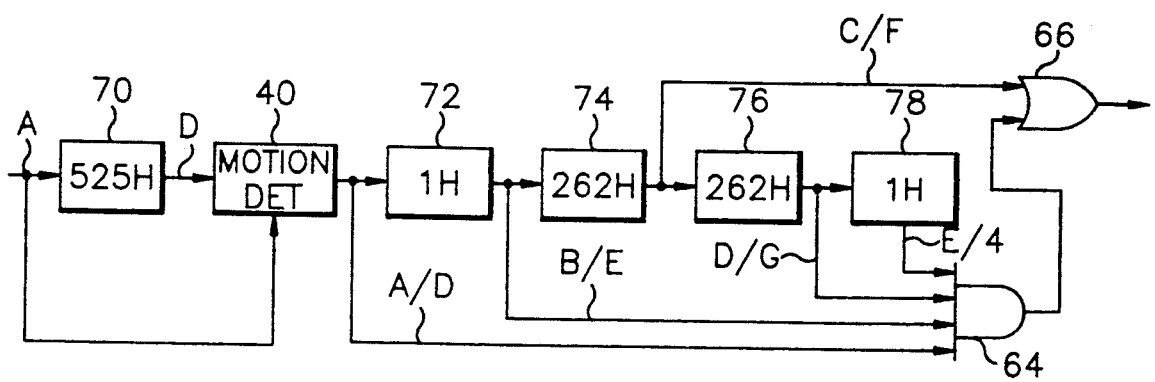
FIG. 7 illustrates a simplified version of the FIG. 6b embodiment.

FIG. 7 performs the same function as FIG. 6b, but requires considerably less hardware than the circuit in FIG. 6b due to successive delaying of the motion detection signal instead of the video signal (such as in the FIG. 5 simplification of FIG. 4). Here, a frame delay 70 cooperates with detector 40 for providing, e.g., the A/D signal, a one-line delay 72 provides the B/E signal, a 262-line delay 74 provides the C/F signal, a 262-line delay 76 provides the D/G signal and a 1-line delay 78 provides the E/H signal. Gates 64 and 66 operate in the same manner as shown and described for FIG. 6b.

Thus, there has been shown and described a novel motion detector which fulfills all the objects and advantages sought therefore. Many changes, modifications, variations and other uses and applications of the subject invention will, however, become apparent to those skilled in the art after considering this specification and its accompanying drawings, which disclose preferred embodiments thereof. In an alternative embodiment, by substituting AND-gate 64 which is shown in FIG. 6b with a PROM, one can easily modify the gating requirement for the motion detection signal. One possibility is that only two of the pairs, either (E,H) and (B,E) or (D,G) and (A,D), have to indicate motion in order for the final output to indicate motion. All such changes, modifications, variations and other uses and applications which do not depart from the spirit and scope of the invention are deemed to be covered by the invention which is limited only by the claims which follow.

I claim:

1. A method for detecting image motion in a video signal, said method comprising the steps of:
generating responsive to said video signal a plurality of interim motion detection signals which are always based upon a comparison of image points in the video signal which are spaced two sequential fields apart; and
gating said plurality of interim motion detection signals together in other to generate a final motion detection signal.

2. The method of claim 1, wherein said generating step comprises the substeps of:
generating each bu one of said plurality of interim motion detection signals which are gated, by delaying the prior outputs of a single motion detector.

3. A method for detecting image motion in a video signal, said method comprising the steps of:
generating responsive to said video signal a multiplicity at least three of interim motion detection signals, which are displaced temporally from each other by an integral number of field intervals of said video signal, each of which interim motion detection signals is based upon a comparison of image points in the video signal which are spaced two sequential fields apart;
combining all but one of said interim motion detection signals together with an AND function; and
combining the output of the AND function and the remaining one of said interim motion detection signals together with an OR function.

4. Apparatus for detecting image motion in a video signal, said apparatus comprising:
generating means responding to said video signal for generating a plurality of interim motion detection signals, each interim motion detection signal always being based upon a comparison of image points in the video signal which are spaced two sequential fields apart; and
gating means for gating said plurality of interim motion detection signals together in order to generate a final motion detection signal.

5. Apparatus for detecting image motion in a video signal, said apparatus comprising:
generating means responding to said video signal for generating a plurality of interim motion detection signals, each interim motion detection signal always being based upon a comparison of image points in the video signal which are spaced two sequential fields apart:
gating means for gating said plurality of interim motion detection together in order to generate a final motion detection signal; and
an OR gate having at least first and second signal inputs included in said gating means, said first input connected for receiving a relatively undelayed one of said interim motion detection signals and said second input connected for receiving a relatively delayed one of said interim motion detection signals.

6. Apparatus for detecting image motion in a video signal, said apparatus comprising:
generating means responding to said video signal for generating a multiplicity at least three of interim motion detection signals, which are displaced temporally from each other by an integral number of field intervals of said video signal, each of which interim motion detection signals is based upon a comparison of image points in the video signal which are spaced two sequential fields apart;
an AND gate for combining all but one of said plurality of interim motion detection signals together; and
an OR gate of non-exclusive type for combining the output of and AND function and the remaining one of said interim motion detection signals together.

7. Apparatus according to claim 6, wherein:
said generating means generates surrounding interim motion detection signals based on comparisons in video signal lines in adjacent frames that are spatially positioned above and below (surrounding) a given line position; and
said surrounding interim motion detection signals are combined in said AND gate, the output of which is combined with the interim motion detection signal for said given line position in said OR gate.

8. Apparatus according to claim 4, wherein said generating means comprises:
- a first frame delay having an input and an output;
- a motion detector having first and second signal inputs and a motion detector output for providing an interim motion detection signal, said video signal being applied to said input of said frame delay and to said first input of said motion detector, and the output of said frame delay being coupled to said second input of said motion detector; and
- a second frame delay having an input to which the output of said motion detector is coupled and having an output for supplying another interim motion detection signal corresponding to an interim motion detection signal generated by said motion detector one frame time period earlier.

9. Apparatus for detecting image motion in a video signal; said apparatus comprising:
- generating means responding to said video signal for generating a plurality of interim motion detection signals, each interim motion detection signal always being based upon a comparison of image points in the video signal which are spaced two sequential fields apart;
- gating means for gating said plurality of interim motion detection signals together in order to generate a final motion detection signal;
- a first frame delay included within said generating means, said first frame delay having an input and an output;
- a motion detector included within said generating means, said motion detector having first and second inputs and having an output for providing a first interim motion detection signal, said video signal being applied to said input of said first frame delay and to said first input of said motion detector, and the output of said first frame delay being coupled to said second input of said motion detector;
- a second frame delay included within said generating means, said second frame delay having an input to which the output of said motion detector is coupled and having an output for supplying a second interim motion detection signal corresponding to an interim motion detection signal generated by said motion detector one frame time period earlier; and
- a third frame delay included within said generating means, said third frame delay having an input to which the output of said second frame delay is coupled and having an output for supplying a third interim motion detection signal to said gating means.

10. Apparatus according to claim 9, further including:
- an AND gate connected for generating an AND gate response to said first and said third interim motion detection signals; and
- an OR gate connected for generating an OR gate response to said AND gate response and said second interim motion detection signal.

11. The method of claim 3, wherein said generating step comprises the substeps of:
- generating each but one of said plurality of interim motion detection signals which are gated, by delaying the prior outputs of a single motion detector.

12. Apparatus according to claim 6, wherein said generating means comprises:
- first, second and third frame delays, each having a respective input and a respective output, the input of said first frame delay having said video signal applied thereto, the input of said second frame delay having said video signal as delayed by one frame time period applied thereto from the output of said first frame delay, and the input of said third frame delay having said video signal as delayed by two frame time periods applied thereto from the output of said second frame delay;
- a first motion detector, having a first signal input to which said video signal is applied, having a second signal input to which the output of said first frame delay is coupled, and having a motion detector output for providing a first interim motion detection signal to said AND gate;
- a second motion detector, having a first signal input to which the output of said first frame delay is coupled, having a second signal input to which the output of said second frame delay is coupled, and having a motion detector output for providing a second interim motion detection signal to said OR gate; and
- a third motion detector, having a first signal input to which the output of said second frame delay is coupled, having a second signal input to which the output of said third frame delay is coupled, and having a motion detector output for providing a third interim motion detection signal to said AND gate.

13. Apparatus according to claim 6, wherein said OR gate of nonexclusive type wherein said generating means comprises:
- a first single-scan-line delay, having an input to which said video signal is applied, and having an output;
- a first plural-scan-line delay of as many full scan lines as there are in one of said fields, having an input to which the output of first single-scan-line delay is coupled, and having an output;
- a second plural-scan-line delay of as many full scan lines as there are in one of said fields, having an input to which the output of first plural-scan-line delay is coupled, and having an output;
- a second single-scan-line delay, having an input to which the output of said second plural-scan-line delay is coupled, and having an output;
- a third plural-scan-line delay of as many full scan lines as there are in one of said fields, having an input to which the output of second single-scan-line delay is coupled, and having an output;
- a fourth plural-scan-line delay of as many full scan lines as there are in one of said fields, having an input to which the output of third plural-scan-line delay is coupled, and having an output;
- a third single-scan-line delay, having an input to which the output of said fourth plural-scan-line delay is coupled, and having an output;
- a first motion detector, having a first signal input to which said video signal is applied, having a second signal input to which the output of said second plural-scan-line delay is coupled, and having a motion detector output for providing a first interim motion detection signal to said AND gate;
- a second motion detector, having a first signal input to which the output of said first single-scan-line delay is coupled, having a second signal input to which the output of said second single-scan-line delay is coupled, and having a motion detector output for providing a second interim motion detection signal to said AND gate;

a third motion detector, having a first signal input to which the output of said first plural-scan-line delay is coupled, having a second signal input to which the output of said third plural-scan-line delay is coupled, and having a motion detector output for providing a third interim motion detection signal to said OR gate;

a fourth motion detector, having a first signal input to which the output of said second plural-scan-line delay is coupled, having a second signal input to which the output of said fourth plural-scan-line delay is coupled, and having a motion detector output for providing a fourth interim motion detection signal to said AND gate and a fifth motion detector, having a first signal input to which the output of said second single-scan-line delay is coupled, having a second signal input to which the output of said third-scan-line delay is coupled, and having a motion detector output for providing a fifth interim motion detection signal to said AND gate.

14. Apparatus according to claim 6 wherein said generating means comprises:

a frame delay, having an input to which said video signal is applied, and having an output;

a motion detector, having a first signal input to which said video signal is applied, having a second signal input to which the output of said first frame delay is coupled, and having a motion detector output coupled to said AND gate for providing a first interim motion detection signal thereto;

a first single-scan-line delay, having an input to which said first interim motion detection signal is applied, and having an output coupled to said AND gate for providing a second interim motion detection signal thereto;

a first plural-scan-line delay of as many full scan lines as there are in one of said fields, having an input to which said second interim motion detection signal is applied, and having an output coupled to said OR gate for providing a third interim motion detection signal thereto;

a second plural-scan-line delay of as many full scan lines as there are in one of said fields, having an input to which said third interim motion detection signal is applied, and having an output coupled to said AND gate for providing a fourth interim motion detection signal thereto; and a second single-scan-line delay, having an input to which said fourth interim motion detection signal is applied, and having an output coupled to said AND gate for providing a fifth interim motion detection signal thereto.

15. Apparatus for detecting image motion in a video signal, said apparatus comprising:

generating means responding to said video signal for generating a plurality of interim motion detection signals which are displaced temporally from each other by an integral number of field intervals of said video signal, each interim motion detection signal always being based upon a comparison of image points in the video signal which are spaced two sequential fields apart; and gating means for gating said plurality of interim motion detection together in order in accordance with digital logic to generate a final motion detection signal, said gating means comprising an OR gate of non-exclusive type having at least first and second signal inputs, said first input connected for receiving a relatively undelayed one of said interim motion detection signals and said second input connected for receiving a relatively delayed one of said interim motion detection signals.

16. Apparatus according to claim 15, wherein said generating means comprises:

a first frame delay, having an input to which said video signal is applied, and having an output coupled to said first signal input of said OR gate;

a motion detector, having a first signal input to which said video signal is applied, having a second signal input to which the output of said first frame delay is coupled, and having a motion detector output for providing an interim motion detection signal; and a second frame delay, having an input to which the output of said motion detector is coupled, and having an output coupled to said second signal input of said OR gate.

17. Apparatus according to claim 15, wherein said OR gate has a third signal input and wherein said generating means comprises:

a frame delay, having an input to which said video signal is applied, and having an output coupled to said first signal input of said OR gate;

a motion detector, having a first signal input to which said video signal is applied, having a second signal input to which the output of said frame delay is coupled, and having a motion detector output for providing an interim motion detection signal;

a plural-scan-line delay of as many full scan lines as there are in one of said fields, having an input to which the output of said motion detector is coupled, and having an output coupled to said second signal input of said OR gate; and a single-scan-line delay, having an input to which the output of said plural-scan-line delay is coupled, and having an output coupled to said third signal input of said OR gate.

* * * * *

UNITED STATES PATENT AND TRADEMARK OFFICE
CERTIFICATE OF CORRECTION

PATENT NO. : 5,267,035
DATED : 30 November 1993
INVENTOR(S) : Hermann J. Weckenbrock, et al.

It is certified that error appears in the above-indentified patent and that said Letters Patent is hereby corrected as shown below:

IN THE CLAIMS

Column 5,

Line 64,    change "bu" to --but--.

Signed and Sealed this

Sixth Day of September, 1994

*Attest:*

BRUCE LEHMAN

*Attesting Officer*     *Commissioner of Patents and Trademarks*